3,090,726
NOVEL COMPOSITION OF MATTER FOR TREATMENT OF NERVOUS DISORDERS

Frank M. Berger, Princeton, N.J., assignor to Carter Products, Inc., New York, N.Y., a corporation of Maryland
No Drawing. Filed June 24, 1957, Ser. No. 667,701
2 Claims. (Cl. 167—65)

This invention relates to a novel composition of matter and particularly to a novel therapeutic agent useful in the treatment of nervous disorders. More particularly, this invention relates to a novel therapeutic agent which possesses unique muscle relaxant and anti-convulsant properties.

Prior to this invention, active ingredients of the invention have been used independently as therapeutic agents. Meprobamate (2-methyl-2-n-propyl-1,3-propanediol dicarbamate) is a known therapeutic agent in exerting a depressant effect on the central nervous system possessing both muscle relaxant and anti-convulsant activity when given in proper dosages.

Prior investigations have shown benactyzine (2-diethylaminoethyl benzilate) to be of value as a psycho-therapeutic agent. This drug has been found to eliminate experimentally-induced conflict behavior in cats and rats.

One of the main drawbacks of benactyzine as a therapeutic agent in mental therapy is the somewhat frequent occurrence of side effects when administered in effective dosages. The chief side effects observed are blurred vision, thought-blocking and dryness of mouth.

Another drawback of benactyzine is its tendency to cause hyperexcitability and when given in large enough dosage to cause convulsions. In one investigation with mice, after intraperitoneal administration of about one half of $LD_{50}$ the animals became hypersensitive to sound and touch and had extended S-shaped tails (Straub reaction). Most animals also had clonic convulsions which alternated with periods of exhaustion. Doses higher than 90 mg./kg. produced clonic convulsions of great violence. The $LD_{50}$ was 155±9 mg./kg. and the mean convulsant dose ($CD_{50}$) was 86±6 mg./kg.

The loss of righting reflex may be considered as an expression of paralyzing action on voluntary muscles. When meprobamate is given to mice in an amount of 130 mg./kg. none of the animals (mice) lose their righting reflex. When given in a dose of 230 mg./kg. one half of the animals lose their righting reflex while all of the animals lose their righting reflex when the dose is 355 mg./kg. Benactyzine has no effect at all on the loss of righting reflex but on the contrary produces convulsions in all the animals with 40% deaths when given in amounts of 120 mg./kg.

It has been found that when meprobamate is combined with benactyzine in accordance with the present invention a loss of righting reflex is obtained in animals with doses of meprobamate which by themselves have no effect. For example, a dose of 120 mg./kg. of meprobamate and 37 mg./kg. of benactyzine produces a loss of righting reflex in half the animals (mice) tested. A dose of 120 mg./kg. of meprobamate and 55 mg./kg. of benactyzine shows loss of righting reflex in all the animals. A dose of 90 mg./kg. of meprobamate and 80 mg./kg. of benactyzine will effect a loss of righting reflex in all the animals. When the combination of this invention was tested on mice for its ability to extend the duration of the loss of the righting reflex, the results obtained again showed the synergistic action between benactyzine and meprobamate. Meprobamate when given in a dose of 235 mg./kg. produced paralysis in half the animals for 33 minutes. The same amount of meprobamate when combined with 20 mg./kg. of benactyzine produced paralysis in all the animals for 145 minutes.

A surprising and unexpected result produced by the novel combination of this invention is the improvement in anti-convulsant activity of meprobamate by the incorporation therewith of a small amount of benactyzine. Tests employing the combination of active ingredients of this invention show that not only does meprobamate prevent convulsions that might otherwise be caused by benactyzine but also quite unexpectedly benactyzine enhances the anti-convulsant activity of meprobamate. Meprobamate is a known anti-convulsant. The dose required for preventing convulsions in 50 percent of mice is 165 mg./kg. Benactyzine produces convulsions in all of the mice with 40% deaths when the dose given is 120 mg./kg. However, a combination of 120 mg./kg. of benactyzine and 90 mg./kg. of meprobamate did not cause convulsions in any of the animals and no deaths resulted.

In general, the preferred ratio of meprobamate to benactyzine is an amount from about 120 to 500 parts per part of benactyzine. Specific examples of tablets within the indicated range are (1) a tablet containing 50 mg. of meprobamate and 0.1 mg. of benactyzine; (2) a tablet containing 600 mg. of meprobamate and 5 mg. benactyzine; (3) a tablet containing 400 mg. of meprobamate and 1 mg. of benactyzine, and (4) a tablet containing 200 mg. of meprobamate and 0.5 mg. of benactyzine. The novel therapeutic compositions of this invention are preferably administered orally in the form of tablets or the like, formed by well-known procedures. A typical composition comprises the combination of active ingredients, i.e., benactyzine and meprobamate, intermixed in a dry, pulverulent state with gelatin, starch, magnesium stearate and alginic acid, pressed into a tablet. The combination of active ingredients may also be dissolved in a suitable solution, such as propylene glycol or alcohol for injection.

The invention in its broader aspects is not limited to the specific compositions described but departures may be made therefrom within the scope of the accompanying claims without departing from the principles of the invention and without sacrificing its chief advantages.

I claim:
1. A novel composition of matter for use in the treatment of nervous disorders containing as active ingredients, 2-methyl-2-n-propyl-1,3-propanediol dicarbamate and 2-diethylaminoethyl benzilate, the amount of said active ingredients being in the ratio from about 120 to 500 parts by weight of 2-methyl-2-n-propyl-1,3-propanediol dicarbamate per part of 2-diethylaminoethyl benzilate.
2. A novel composition of matter for use in the treatment of nervous disorders containing as active ingredients 2-methyl-2-n-propyl-1,3-propanediol dicarbamate and 2-diethylaminoethyl benzilate, the amount of said active ingredients being in the ratio of 400 parts by weight of 2-methyl-2-n-propyl-1,3-propanediol dicarbamate to one part of diethylaminoethyl benzilate.

References Cited in the file of this patent
UNITED STATES PATENTS

| 2,724,720 | Berger | Nov. 22, 1955 |
| 2,784,141 | Jacobsen | Mar. 5, 1957 |

OTHER REFERENCES

Psychopharmaca, Public Health Service Publication No. 581, Public Health Bibliography Series No. 19, 1958, p. 109.

Fortune: "Schering's Structural Roulette," pp. 102–107, 158, 160, and 162 in August 1958 issue of Fortune magazine, pub. by Time, Inc.

(Other references on following page)

OTHER REFERENCES

Roche Medical Image, January 1960, vol. 2, No. 1, pp. 23–25, "Montreal Neurological's Explorers."

Washburn: Scientific American, September 1960, vol. 203, No. 3, pp. 63–75, esp. pp. 73–75 diagrams, "Sensory Homunculus," "Motor Homunculus" in Homo sapiens, in monkeys.

Hearings Before the Subcommittee on Antitrust and Monopoly of the Committee on the Judiciary, United States Senate, 86th Congress, 2nd Session, Pursuant to S. Res. 57, January 21–29, 1960, part 16 (Tranquilizers), pp. 9039–9067; Part 17 (Tranquilizers-Appendix), pp. 9507–9528; 9569–9604; 9622–9634; published by United States Goverment Printing Office, Washington, 1960. For sale by the Superintendent of Documents, $2.50 per part.